(12) United States Patent
Sun et al.

(10) Patent No.: US 12,445,904 B2
(45) Date of Patent: Oct. 14, 2025

(54) DATA TRANSMISSION METHOD AND DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Junshuai Sun, Beijing (CN); Guangyi Liu, Beijing (CN); Yuhong Huang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 347 days.

(21) Appl. No.: 18/007,457

(22) PCT Filed: Jul. 8, 2021

(86) PCT No.: PCT/CN2021/105211
§ 371 (c)(1),
(2) Date: Jan. 30, 2023

(87) PCT Pub. No.: WO2022/033251
PCT Pub. Date: Feb. 17, 2022

(65) Prior Publication Data
US 2023/0292177 A1 Sep. 14, 2023

(30) Foreign Application Priority Data
Aug. 11, 2020 (CN) .......................... 202010799996.2

(51) Int. Cl.
*H04W 28/06* (2009.01)
*H04L 69/16* (2022.01)
(Continued)

(52) U.S. Cl.
CPC .......... *H04W 28/065* (2013.01); *H04L 69/16* (2013.01); *H04W 28/0967* (2020.05); *H04W 28/24* (2013.01)

(58) Field of Classification Search
CPC .......... H04W 28/065; H04W 28/0967; H04W 28/24; H04L 69/16; H04L 67/142;
(Continued)

(56) References Cited

U.S. PATENT DOCUMENTS

2018/0324631 A1 11/2018 Jheng et al.
2019/0253938 A1 8/2019 Sayenko
(Continued)

FOREIGN PATENT DOCUMENTS

CN 106332178 A 1/2017
CN 108809584 A 11/2018
(Continued)

OTHER PUBLICATIONS

Huawei et al "Support of Alternative QoS Profiles" 3GPP TSG-RAN3 Meeting #108-e, R3-203638, Jun. 11, 2020 (Jun. 11, 2020), entire document.
(Continued)

*Primary Examiner* — Shawn D Miller
(74) *Attorney, Agent, or Firm* — SYNCODA LLC; Feng Ma

(57) ABSTRACT

A data transmission method includes: upon receiving first data carried on a first access stratum (AS) carrier, a terminal converts the first data into a first IP data packet of a first IP flow, and receives the first IP data packet; and when sending a second IP data packet of a second IP flow, the terminal
(Continued)

carries the second IP data packet on a second AS carrier and sends out. According to embodiments of the present application, using an iP data transmission mode between an AS layer and a NAS layer can introduce a new control function in an RAN, thereby implementing an end-to-end QoS architecture solution, and providing support for rollback and lossless switching of IP packets.

16 Claims, 8 Drawing Sheets

(51) Int. Cl.
*H04W 28/08* (2023.01)
*H04W 28/24* (2009.01)

(58) Field of Classification Search
CPC ......... H04L 69/165; H04L 69/22; H04L 1/16; H04L 1/1607
See application file for complete search history.

(56) References Cited

U.S. PATENT DOCUMENTS

| | | | |
|---|---|---|---|
| 2019/0356453 A1* | 11/2019 | Li | H04W 4/12 |
| 2020/0008114 A1* | 1/2020 | Luo | H04W 36/0072 |
| 2020/0067843 A1 | 2/2020 | Li et al. | |
| 2020/0128132 A1* | 4/2020 | Nguyen | H04M 1/72469 |
| 2021/0006498 A9 | 1/2021 | Li et al. | |

FOREIGN PATENT DOCUMENTS

| | | |
|---|---|---|
| CN | 109996346 A | 7/2019 |
| CN | 110831075 A | 2/2020 |
| CN | 111050363 A | 4/2020 |
| CN | 111050420 A | 4/2020 |

OTHER PUBLICATIONS

International Search Report in the international application No. PCT/CN2021/105211, mailed on Sep. 28, 2021.
Written Opinion of the International Search Authority in the international application No. PCT/CN2021/105211, mailed on Sep. 28, 2021.
"3rd Generation Partnership Project; Technical Specification Group Radio Access Network; E-UTRA and NR; Service Data Adaptation Protocol (SDAP) specification (Release 15)", 3GPP Draft; RP-171985 TS 37324-V100, 3rd Genertion Partnership Project (3GPP), Mobile Competence Centre; 650, Route Deslucioles; F-06921 Sophia-Antipolis Cedex; France vol. TSG RAN, Sep. 4, 2017 (Sep. 4, 2017), XP051669202, p. 6-p. 12. 15 pages.
Qualcomm Europe: "SAE Transport Service Architecture Principles", 3GPP Draft; S2-063472 Sae Transport Service Architecture, 3rd Generation Partnership Project (3GPP), Mobile Competence Centre; 650, Route Des Lucioles; F-06921 Sophia-Antipolis Cedex; France, vol. SA WG2, No. Busan; 20061017, Oct. 17, 2006 (Oct. 17, 2006), pp. 1-8, XP050257327, p. 1-p. 8. 8 pages.
"3rd Generation Partnership Project; Technical Specification Group Radio Access Network; NR; NR and NG-RAN Overall Description; Stage 2 (Release 16)", 3GPP Draft; 38300-G20, 3rd Generation Partnership Project (3GPP), Mobile Competence Centre; 650, Route Des Lucioles; F-06921 Sophia-Antipolis Cedex; France, Jul. 24, 2020 (Jul. 24, 2020), XP052353410, section 12.1. 148 pages.
Supplementary European Search Report in the European application No. 21855304.8, mailed on Nov. 17, 2023. 9 pages.

* cited by examiner

DATA TRANSMISSION METHOD AND DEVICE

CROSS-REFERENCE TO RELATED APPLICATIONS

This application is a National Stage of International Application No. PCT/CN2021/105211 filed on Jul. 8, 2021, which claims priority to Chinese Patent Application No. 202010799996.2 filed on Aug. 11, 2020. The disclosures of the above-referenced applications are hereby incorporated by reference in their entirety.

TECHNICAL FIELD

The disclosure relates to the technical field of mobile communication, and in particular to a data transmission method and device.

BACKGROUND

At present, a Quality of Service (QoS) model of the 5th Generation Mobile Communications (5G) is constructed based on a QoS flow. The QoS flow, QoS profile, QoS rule and other QoS related control parameters in the QoS model are configured by a Session Management Function (SMF) of a 5G Core Network (5GC).

In the general description of QoS of 5G, a QoS architecture at a base station side includes:

1) for each piece of UE, the 5GC establishes one or more Protocol Data Unit (PDU) sessions;
2) for each terminal (UE), the Next Generation-Radio Access Network (NG-RAN) establishes at least one Data Radio Bearer (DRB) when establishing the PDU session, and other DRBs of the PDU session that bear the QoS flow may be configured later;
3) the NG-RAN bears data packets of different PDU sessions on different DRBs;
4) uplink and downlink data packets are associated with the QoS flows in a packet filter of the Non-Access Stratum (NAS) level of the UE and the 5GC; and
5) uplink and downlink QoS flows are associated with the DRBs in a mapping rule of the Access Stratum (AS) level of the UE and the NG-RAN.

FIG. 1 shows a schematic diagram of a QoS architecture. The QoS flow is an end-to-end data transmission channel between a data plane at the NAS of the UE and a UPF at the NAS at a network side. In an NG-U interface between the 5GC and the NG-RAN, data transmission is performed through the QoS flow. The NG-RAN provides a Radio Bearer (RB) to bear the QoS flow and complete data transmission between UE and a base station (NB). FIG. 2 shows a protocol model of an Ng interface. In an Ng interface of 5G, a data packet type transmitted by a Radio Network Layer (RNL) is not defined in the protocol. The protocol adopted by a Transport Network Layer (TNL) is a General Packet Radio Service (GPRS) Tunneling Protocol for User Plane (GTP-U) based on a User Datagram Protocol (UDP).

SUMMARY

At least one embodiment of the present disclosure provides a data transmission method and device. Using an IP-based data transmission mode between an AS and an NAS can introduce a QoS control function in an RAN, thereby implementing a new end-to-end QoS architecture solution, and providing support for rollback and lossless handover of IP packets.

According to an aspect of the present disclosure, at least one embodiment provides a data transmission method applied to a terminal, which may include the following operations.

When receiving first data borne on a first AS Bearer (ASB), the terminal converts the first data into a first IP data packet of a first IP flow, and receives the first IP data packet.

When sending a second IP data packet of a second IP flow, the terminal bears the second IP data packet on a second ASB and then sends the second IP data packet out.

Moreover, according to at least one embodiment of the present disclosure, before the first data is converted into the first IP data packet of the first IP flow, the method may further include that: the first IP flow corresponding to the first ASB is determined according to mapping relationships between IP flows and ASBs.

Before the second IP data packet is borne on the second ASB and then sent out, the method may further include that: the second ASB corresponding to the second IP flow is determined according to mapping relationships between the IP flows and the ASBs.

Moreover, according to at least one embodiment of the present disclosure, the operation that the first IP data packet is received according to an IP packet processing mechanism may include the following operations.

Header and value check is performed on the first IP data packet.

When the header and value check is passed, the first IP data packet is sent to the NAS of the terminal.

When the header and value check fails, a retransmission request for the first IP data packet is sent to the terminal.

Moreover, according to at least one embodiment of the present disclosure, the method may further include the following operations.

The terminal caches the second IP data packet in the AS.

When receiving the retransmission request for the second IP data packet, the terminal resends the second IP data packet cached in the AS.

When receiving feedback information indicating the successful reception of the second IP data packet, the terminal deletes the second IP data packet cached in the AS.

Moreover, according to at least one embodiment of the present disclosure, the ASB is a combination of a QoS flow and a DRB, and the mapping relationships between the IP flows and the ASBs are mapping relationships between the IP flows and the QoS flows and/or the DRBs.

Moreover, according to at least one embodiment of the present disclosure, the ASB is any of the following: a QoS flow, a DRB, a logical channel, a transport channel, a physical channel, and a bearer which is defined in the AS for bearing the IP data packets.

Moreover, according to at least one embodiment of the present disclosure, the method may further include the following operations.

In a process that a base station establishes, adds or reconfigures a PDU session of a first service of the terminal, a QoS parameter configuration command of the AS sent by the base station is received.

The mapping relationship between the IP flow and the ASB of the PDU session is determined according to the QoS parameter configuration command.

According to another aspect of the present disclosure, at least one embodiment provides a data transmission method applied to a base station, which may include the following operations.

When a first IP data packet of a first IP flow is sent, the first IP data packet is borne on a first ASB and then sent out.

When receiving second data borne on a second ASB, the second data is converted into a second IP data packet of a second IP flow, and the second IP data packet is received.

Moreover, according to at least one embodiment of the present disclosure, before the first IP data packet is borne on the first ASB and then sent out, the method may further include that: the first ASB corresponding to the first IP flow is determined according to the mapping relationships between the IP flows and the ASBs.

Before the second data is converted into the second IP data packet of the second IP flow, the method may further include that: the second IP flow corresponding to the second ASB is determined according to the mapping relationships between the IP flows and the ASBs.

Moreover, according to at least one embodiment of the present disclosure, the operation that the second IP data packet is received according to an IP packet processing mechanism may include the following operations.

Header and value check is performed on the second IP data packet.

When the header and value check is passed, the second IP data packet is sent to the NAS of the base station.

When the header and value check fails, a retransmission request for the second IP data packet is sent to the terminal.

Moreover, according to at least one embodiment of the present disclosure, the method may further include the following operations.

The base station caches the first IP data packet in the AS.

When receiving the retransmission request for the first IP data packet, the base station resends the first IP data packet cached in the AS.

When receiving feedback information indicating the successful reception of the first IP data packet, the base station deletes the first IP data packet cached in the AS.

Moreover, according to at least one embodiment of the present disclosure, the ASB is a combination of a QoS flow and a DRB, and the mapping relationships between the IP flows and the ASBs are the mapping relationships between the IP flows and the QoS flows and/or the DRBs.

Moreover, according to at least one embodiment of the present disclosure, the ASB is any of the following: a QoS flow, a DRB, a logical channel, a transport channel, a physical channel, and a bearer which is defined in the AS for bearing the IP data packets.

Moreover, according to at least one embodiment of the present disclosure, the method may further include the following operations.

In the process of establishing, adding or reconfiguring a PDU session of a first service of the terminal, a QoS requirement for the receiving and sending of data of the first service on an air interface is determined.

According to the QoS requirement for the receiving and sending of data of the first service on the air interface, the mapping relationship between the IP flow and the ASB of the PDU session of the first service is configured, and a QoS parameter configuration command of the AS is sent to the terminal. The QoS parameter configuration command is used for configuring the mapping relationship between the IP flow and the ASB of the PDU session of the first service at the terminal side.

Moreover, according to at least one embodiment of the present disclosure, the operation that the QoS requirement for the receiving and sending of data of the first service on the air interface is determined may include the following operation.

The QoS requirement for the receiving and sending of data of the first service on the air interface is determined according to at least one of the QoS requirement of the first service configured by a Core Network (CN), the channel quality of the terminal or the requirement of a wireless system to which the base station belongs for the transmission quality of the air interface.

Moreover, according to at least one embodiment of the present disclosure, the method may further include the following operations.

When the TNL of the base station receives a third IP data packet from the RNL of the base station, the base station converts the third IP data packet into a first Transmission Control Protocol (TCP) datagram or a first UDP datagram according to the data packet transmission characteristics and/or QoS requirements corresponding to the third IP data packet, and then sends the third IP data packet out.

When the RNL of the base station receives a second TCP datagram or a second UDP datagram from the CN, the base station converts the second TCP datagram or the second UDP datagram into a fourth IP data packet and then sends the fourth IP data packet to the TNL.

According to another aspect of the present disclosure, at least one embodiment provides a data transmission method applied to a CN device, which may include the following operations.

When the TNL of the CN device receives a first TCP datagram or a first UDP datagram sent by the base station, the CN device converts the first TCP datagram or the first UDP datagram into a third IP data packet and then sends the first TCP datagram or the first UDP datagram to its RNL.

When the TNL of the CN device receives a fourth IP data packet from the RNL of the CN device, the CN device converts the fourth IP data packet into the second TCP datagram or the second UDP datagram according to the data packet transmission characteristics and/or QoS requirements corresponding to the fourth IP data packet, and then sends the second TCP datagram or the second UDP datagram out.

According to another aspect of the present disclosure, at least one embodiment provides a terminal, which may include: a first processing module and a second processing module.

The first processing module is configured to: when receiving the first data borne on the first ASB and sent by the base station, determine the first IP flow corresponding to the first ASB according to mapping relationships between IP flows and ASBs, convert the first data into the first IP data packet of the first IP flow, and receive the first IP data packet according to the IP packet processing mechanism.

The second processing module is configured to: when sending the second IP data packet of the second IP flow to the base station, determine the second ASB corresponding to the second IP flow according to mapping relationships between IP flows and ASBs, and bear the second IP data packet on the second ASB and then send the second IP data packet out.

Moreover, according to at least one embodiment of the present disclosure, the second processing module is further configured to: cache the second IP data packet in the AS; and when receiving the retransmission request for the second IP data packet sent by the base station, resend the second IP data packet cached in the AS; when receiving the feedback information indicating successful reception of the second IP data packet sent by the base station, delete the second IP data packet cached in the AS.

Moreover, according to at least one embodiment of the present disclosure, the ASB is a combination of a QoS flow and a DRB, and the mapping relationships between the IP flows and the ASBs are mappings relationships between the IP flows and the QoS flows and/or the DRBs.

One DRB can belong to only one PDU session; one PDU session includes at least one IP flow; the mapping relationships between the IP flows and the QoS flows include many-to-one relationship and one-to-one relationship; and the mapping relationships between the QoS flows and the DRBs include many-to-one relationship, one-to-one relationship, and one-to-many relationship.

Moreover, according to at least one embodiment of the present disclosure, the ASB is any of the following: a QoS flow, a DRB, a logical channel, a transport channel, a physical channel, and a bearer which is defined in the AS for bearing the IP data packets.

The mapping relationships between the IP flows and the ASBs include many-to-one relationship, one-to-one relationship, and one-to-many relationship.

Moreover, according to at least one embodiment of the present disclosure, the terminal may further include a mapping relationship establishing module.

The mapping relationship establishing module is configured to: in a process that the base station establishes, adds or reconfigures the PDU session of the first service of the terminal, receive a QoS parameter configuration command of the AS sent by the base station; and determine the mapping relationship between the IP flow and the ASB of the PDU session according to the QoS parameter configuration command.

According to another aspect of the present disclosure, at least one embodiment provides a terminal, which may include: a processor, a memory, and a program which is stored in the memory and capable of running in the processor. The program, when executed by the processor, implements the steps of the above data transmission method.

According to another aspect of the present disclosure, at least one embodiment provides a base station, which may include: a first processing module and a second processing module.

The first processing module is configured to: when sending the first IP data packet of the first IP flow to the terminal, determine the first ASB corresponding to the first IP flow according to the mapping relationships between the IP flows and the ASBs, and bear the first IP data packet on the first ASB and then send the first IP data packet out.

The second processing module is configured to: when receiving the second data borne on the second ASB and sent by the terminal, determine the second IP flow corresponding to the second ASB according to the mapping relationships between the IP flows and the ASBs, convert the second data into the second IP data packet of the second IP flow, and receive the second IP data packet according to the IP packet processing mechanism.

Moreover, according to at least one embodiment of the present disclosure, the first processing module is further configured to: cache the first IP data packet in the AS; when receiving the retransmission request for the first IP data packet sent by the terminal, resend the first IP data packet cached in the AS; and when receiving the feedback information indicating the successful reception of the first IP data packet sent by the terminal, delete the first IP data packet cached in the AS.

Moreover, according to at least one embodiment of the present disclosure, the ASB is a combination of a QoS flow and a DRB, and the mapping relationships between the IP flows and the ASBs are the mapping relationships between the IP flows and the QoS flows and/or the DRBs.

One DRB can belong to only one PDU session; one PDU session includes at least one IP flow; the mapping relationships between the IP flows and the QoS flows include many-to-one relationship and one-to-one relationship; and the mapping relationships between the QoS flows and the DRBs include many-to-one relationship, one-to-one relationship, and one-to-many relationship.

Moreover, according to at least one embodiment of the present disclosure, the ASB is any of the following: a QoS flow, a DRB, a logical channel, a transport channel, a physical channel, and a bearer which is defined in the AS for bearing the IP data packets.

The mapping relationships between the IP flows and the ASBs include many-to-one relationship, one-to-one relationship, and one-to-many relationship.

Moreover, according to at least one embodiment of the present disclosure, the base station may also include a configuring module.

The configuring module is configured to: in a process of establishing, adding or reconfiguring the PDU session of the first service of the terminal, determine the QoS requirement for the receiving and sending of data of the first service on the air interface; configure the mapping relationship between the IP flow and the ASB of the PDU session of the first service according to the QoS requirement for the receiving and sending of data of the first service on the air interface, and send the QoS parameter configuration command of the AS to the terminal. The QoS parameter configuration command is used for configuring the mapping relationship between the IP flow and the ASB of the PDU session of the first service at the terminal side.

Moreover, according to at least one embodiment of the present disclosure, the configuring module is further configured to: determine the QoS requirement for the receiving and sending of data of the first service on the air interface according to at least one of the QoS requirement of the first service configured by the CN, the channel quality of the terminal or the requirement of a wireless system to which the base station belongs for the transmission quality of the air interface.

Moreover, according to at least one embodiment of the present disclosure, the base station may further include: a third processing module and a fourth processing module.

The third processing module is configured to: when the TNL of the base station receives the third IP data packet from the RNL of the base station, convert the third IP data packet into the first TCP datagram or the first UDP datagram according to a data packet transmission characteristic and/or a QoS requirement corresponding to the third IP data packet, and then send the first TCP datagram or the first UDP datagram out.

The fourth processing module is configured to: when the RNL of the base station receives the second TCP datagram or the second UDP datagram from the CN, convert the second TCP datagram or the second UDP datagram into the fourth IP data packet and then send the fourth IP data packet to the TNL.

According to another aspect of the present disclosure, at least one embodiment provides a base station, which may include: a processor, a memory, and a program which is stored in the memory and capable of running in the processor. When executed by the processor, the program implements the steps of the above data transmission method.

According to another aspect of the present disclosure, at least one embodiment provides a CN device, which may include: a first processing module and a second processing module.

The first processing module is configured to: when the TNL of the CN device receives the first TCP datagram or the first UDP datagram sent by the base station, convert the first TCP datagram or the first UDP datagram into the third IP data packet and then send the third IP data packet to the RNL of the CN device.

The second processing module is configured to: when the TNL of the CN device receives the fourth IP data packet from the RNL of the CN device, convert the fourth IP data packet into the second TCP datagram or the second UDP datagram according to a data packet transmission characteristic and/or a QoS requirement corresponding to the fourth IP data packet, and then send the second TCP datagram or the second UDP datagram out.

According to another aspect of the present disclosure, at least one embodiment provides a CN device, which may include: a processor, a memory, and a program which is stored in the memory and capable of running in the processor. When executed by the processor, the program implements the steps of the above data transmission method.

According to another aspect of the present disclosure, at least one embodiment provides a computer-readable storage medium, in which a program is stored. When executed by the processor, the program implements the steps of the above method.

Compared with the conventional art, according to the data transmission method and device provided by the embodiments of the present disclosure, using an IP-based data transmission mode between an AS and an NAS can introduce a new QoS control function in an RAN, thereby implementing an end-to-end QoS architecture solution, and providing support for rollback and lossless handover of IP packets. Moreover, the embodiments of the present disclosure may also implement a data rollback mechanism between an AS and an NAS to improve the data transmission efficiency.

BRIEF DESCRIPTION OF THE DRAWINGS

By reading the detailed description of preferred implementation modes below, a variety of other advantages and benefits will become clear to those of ordinary skill in the art. The accompanying drawings are only intended to illustrate the purpose of the preferred implementation modes and are not considered as a limitation on the present disclosure. In addition, the same reference marks are used to indicate the same parts throughout the accompanying drawings. In the accompanying drawings.

DETAILED DESCRIPTION

Figure 1:
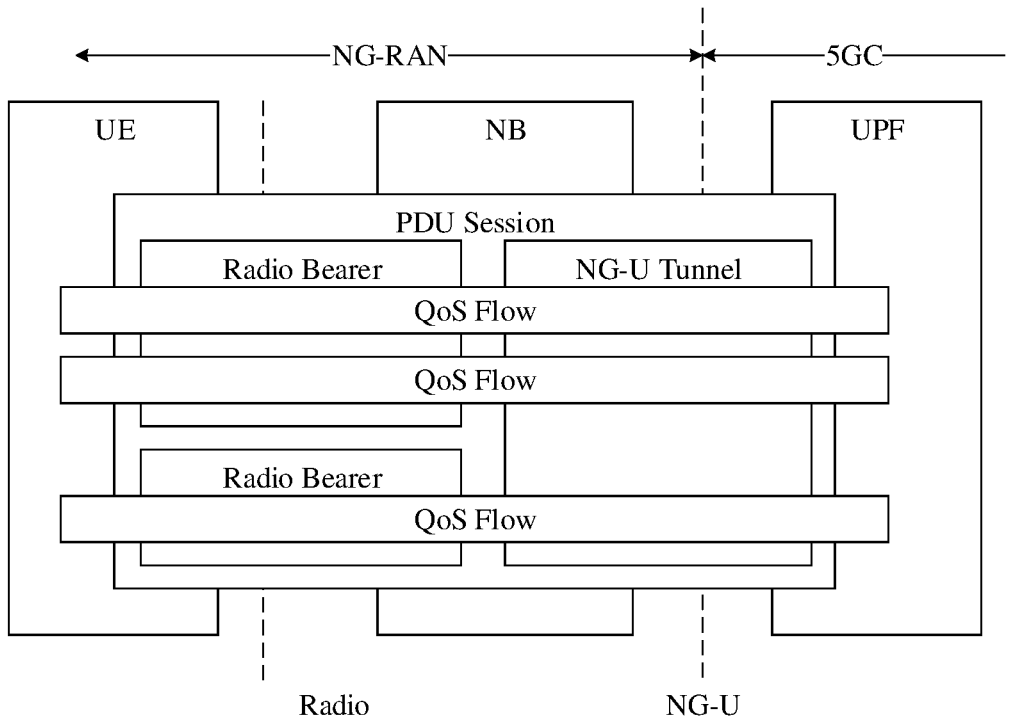
FIG. 1 is a schematic diagram of a QoS architecture in the conventional art.
Figure 2:
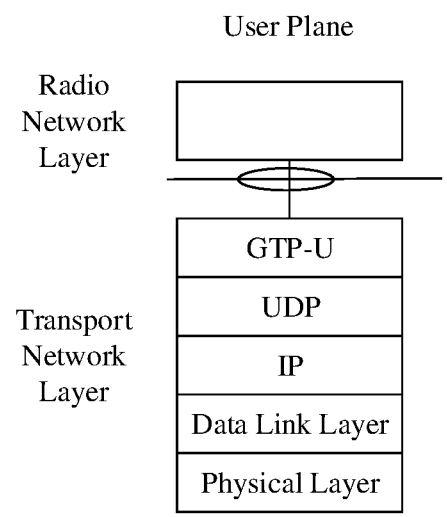
FIG. 2 is a schematic diagram of a protocol model of an Ng interface in the conventional art.

Exemplary embodiments of the present disclosure will be described in more detail with reference to the drawings. Although the exemplary embodiments of the present disclosure are shown in the drawings, it should be understood that the present disclosure may be implemented in various forms and shall not be limited by the embodiments described here. Rather, these embodiments are provided in order to have a more thorough understanding of the present disclosure and to be able to fully convey the scope of the present disclosure to those skilled in the art.

Terms "first", "second" and the like in the specification and claims of the disclosure are used to distinguish similar objects and do not have to describe a specific sequence or order. It should be understood that the objects may be exchanged under appropriate circumstances, so that the embodiments of the present disclosure described here may, for example, be implemented in an order different from that described or shown here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead. "And/or" in the specification and the claims represents at least one of connected objects.

The technologies described herein are not limited to a New Radio (NR) system and a Long Term Evolution (LTE)/LTE-Advanced (LTE-A) system, and may also be applied to various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-bearer Frequency-Division Multiple Access (SC-FDMA), and other systems. Terms "system" and "network" are usually used interchangeably. The CDMA system may implement radio technologies such as CDMA2000 and Universal Terrestrial Radio Access (UTRA). UTRA includes Wideband CDMA (WCDMA) and other CDMA variations. The TDMA system may implement radio technologies such as Global System for Mobile Communication (GSM). The OFDMA system may implement radio technologies such as Ultra Mobile Broadband (UMB), Evolution-UTRA (E-UTRA), Institute of Electrical and Electronics Engineers (IEEE) 802.21 (Wireless Fidelity (Wi-Fi)), IEEE 802.16 (World Interoperability for Microwave Access (WiMAX)), IEEE 802.20, and Flash-OFDM. UTRA and E-UTRA are part of Universal Mobile Telecommunications System (UMTS). LTE and more advanced LTE (such as LTE-A) are new UMTS releases using E-UTRA. UTRA, E-UTRA, UMTS, LTE, LTE-A and GSM are described in the documents from the organization named after "3rd Generation Partnership Project (3GPP)". CDMA2000 and UMB are described in the documents from the organization named after "3GPP2". The technologies described herein may be applied not only to the above-mentioned systems and radio technologies but also to other systems and radio technologies. However, a New Radio (NR) system is described below as an example, and NR terms are used in most of the following descriptions although these technologies may also be applied to systems except the NR system.

The following descriptions are exemplary and not intended to limit the scope, applicability or configuration described in the claims. Functions and arrangements of discussed elements may be changed without departing from the spirit and scope of the disclosure. Various procedures or components may be omitted, replaced or added appropriately in each example. For example, the described method may be executed in sequences different from that described here, and various steps may be added, omitted or combined. In addition, features described with reference to some examples may be combined in other examples.

In a QoS model of a QoS architecture of 5G based on the conventional art, QoS parameters corresponding to a QoS flow is configured by a CN, and there is no data rollback mechanism between an AS and an NAS. To solve at least one of the above problems, the embodiments of the present disclosure provide a data transmission method, which implements an end-to-end QoS architecture solution by using an IP-based data transmission mode between the AS and the NAS, and introducing a new QoS control function in an RAN. Specifically, compared with the QoS architecture in 5G, in the embodiments of the present disclosure, data packets are borne between the NAS and the AS by way of IP; in addition, an IP packet processing and air-interface-and-high-layer-oriented common QoS control mechanism are introduced in the AS.

Figure 3:
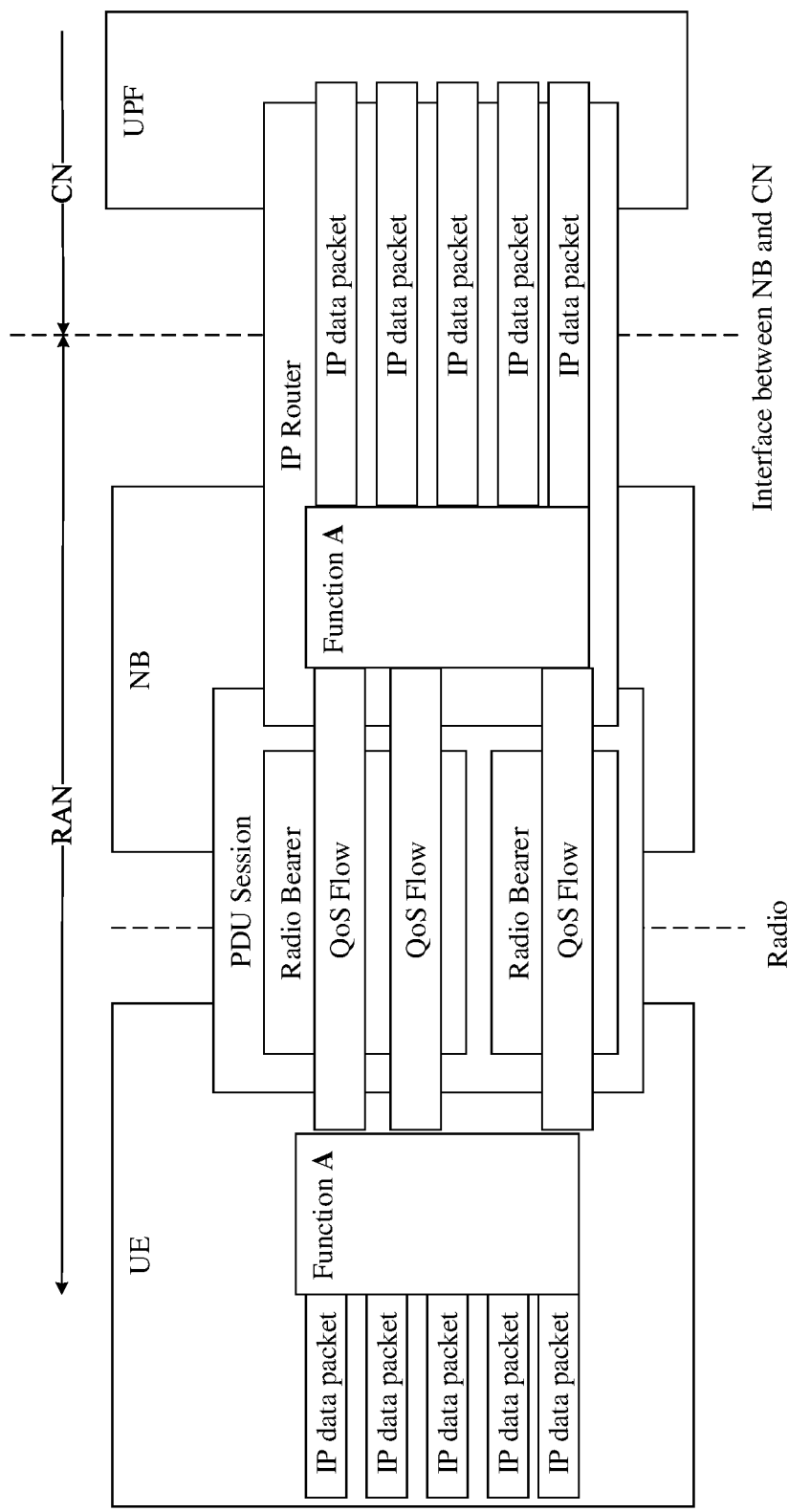
FIG. 3 is a schematic diagram of a QoS architecture according to an embodiment of the present disclosure.
Figure 4:
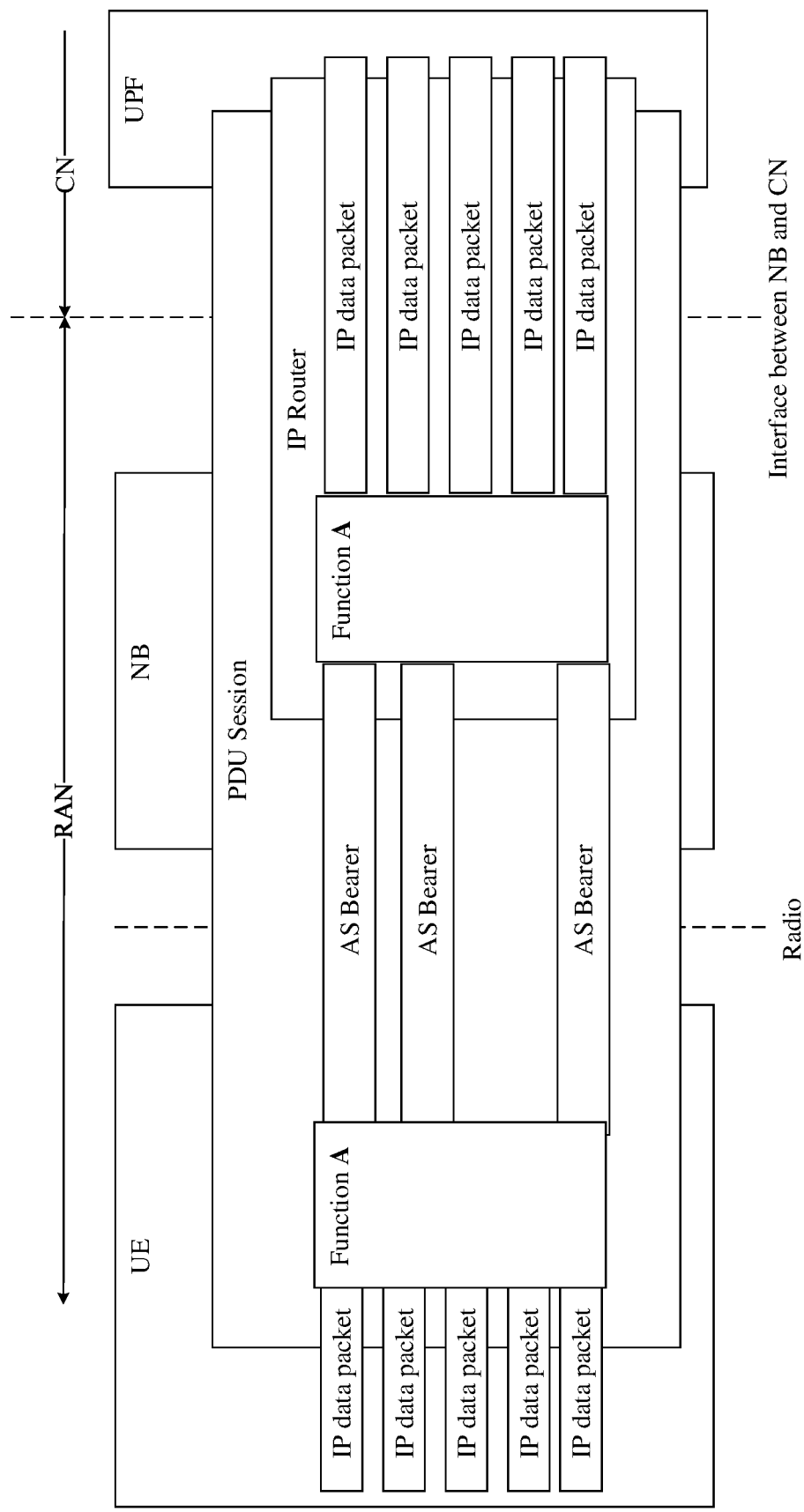
FIG. 4 is a schematic diagram of another QoS architecture according to an embodiment of the present disclosure.

FIG. 3 and FIG. 4 respectively show the schematic diagrams of two QoS architectures according to the embodiments of the present disclosure. FIG. 3 is an enhancement based on the QoS architecture of 5G, which uses the QoS flow and DRB of 5G, adds a bearing mode of IP packets in the AS and the NAS, and adds an IP packet processing and QoS control function in the AS. FIG. 4 is a new design with the bearing of only one AS.

An AS bearer (ASB) is introduced in the embodiments of the present disclosure. The ASB refers to the bearer that can bear IP packets in the AS. In addition, referring to FIG. 3 and FIG. 4, a function A entity is also introduced in the embodiments of the present disclosure. The function A entity is used for implementing the IP packet processing and QoS control function (implementing a QoS filtering function between upper and lower layers). A PDU session is a session connection between two equivalent function A entities. An IP flow is the minimum granularity of the PDU Session. One PDU session may contain one or more IP flows. Both input and output of the PDU session are IP data packets. One PDU session may contain one or more ASBs.

In FIG. 3, the ASB is a combination of the QoS flow and the DRB, each DRB may bear one or more QoS flows, and one DRB can belong to only one PDU session. One terminal may establish one or more PDU sessions at the same time. Mapping relationships between the QoS flows and the DRBs may be one-to-one relationship, many-to-one relationship, or one-to-many relationship. In FIG. 3, the IP flow is borne by the QoS flow (the IP flow is mapped to the QoS flow, the same below), and the QoS flow is borne by an RB (the QoS flow is mapped to the RB, the same below). One or more IP flows may be mapped to one QoS flow, and one or more QoS flows may be mapped to one RB. The mapping relationships in FIG. 3 are three-level mapping relationships among the IP flows, the QoS flows and the RBs.

In FIG. 4, the IP flow implements an end-to-end connection directly through the ASB. Specifically, the ASB may be one of the following:
A) QoS flow;
B) DRB;
C) logical channel;
D) transport channel;
E) physical channel; and
F) other defined bearers of the AS that can bear the IP data packets, which are different from A to E above.

The mapping relationships in FIG. 4 are two-level mapping relationships between the IP flows and the ASBs. In FIG. 4, each ASB may bear one or more IP flows, and one ASB can belong to only one PDU session. One terminal may establish one or more PDU sessions at the same time. The mapping relationships between the IP flows and the ASBs may be one-to-one relationship, many-to-one relationship, or one-to-many relationship.

Based on the above architecture, in the embodiments of the present disclosure, an IP data packet processing function (namely function A) is added in the AS, so that the AS can cache the IP data packets and provide the IP data packets for a lower layer; in addition, when needing to retransmit the IP data packets, the lower layer can directly apply for the IP data packets from the function A entity without sending a data forwarding request to the NAS (terminal side) or UPF (network side) as in 4G/5G; therefore, the data rollback mechanism between the AS and the NAS is implemented.

In the embodiments of the present disclosure, the terminal side and the network side are functionally equivalent. Specifically,
for the terminal side,
the function A entity (IP packet processing and QoS control function) is added in the AS in the embodiments of the present disclosure. When receiving data sent by the network side, the function A entity obtains and submits data packets in an IP format to an upper layer according to an IP packet processing mechanism, QoS parameter and mapping relationship configured by the network side. Here, for FIG. 3, the mapping relationships are first mapping relationships between the IP flows and the QoS flows and/or the DRBs, specifically the mapping relationships between the IP flows and the QoS flows, the mapping relationships between the IP flows and the DRBs, or the mapping relationships between the IP flows and "a combination of the QoS flows and the DRBs". In FIG. 4, the mapping relationships are the mapping relationships between the IP data flows and the ASBs. When sending data to the network side, the function A entity processes the IP packets by itself according to the configuration of the network side or with reference to the configuration of the network side, generates data packets to be sent according to the format of data packets sent on the QoS flow, and sends the data packets to the network side through the QoS flow and the DRB.

In addition, data is transmitted between the NAS and the AS by way of IP packet. The interlayer bearer between the NAS and the AS is the IP flow.

For the network side, the function A entity (IP packet processing and QoS control function) is added at the base station in the embodiments of the present disclosure, as described below.

1) QoS applicable to the transmission quality of an air interface is generated. For example, a QoS requirement of a service configured by the CN is received, and a QoS requirement for the receiving and sending of data applicable to the service on the air interface is generated according to the channel quality for the user to receive and send data on the air interface or the overall requirement of a wireless system on the air interface.

2) A control plane of the base station is triggered to generate configuration signaling to the user, configure the QoS parameter of the AS to the terminal, and validate the signaling at the base station side. For an uplink service (sent by the terminal to the base station), the base station may configure an explicit QoS demand control command that the terminal must execute, and may also configure a selective QoS demand control command, so that the terminal makes a selection that is flexible to some extent under the QoS demand control command. The configuration signaling may be carried in establishment, addition or reconfiguration signaling of the PDU session or in establishment, addition or reconfiguration signaling of the DRB.

3) The IP data packets sent to the terminal are converted into the data packets that can be borne by the QoS flow and sent to the air interface in a data packet format and mode specified on the QoS flow. After the data packets sent by the terminal through the QoS flow are received, they are converted into a packet format of the IP flow and sent to the upper layer.

Figure 5:
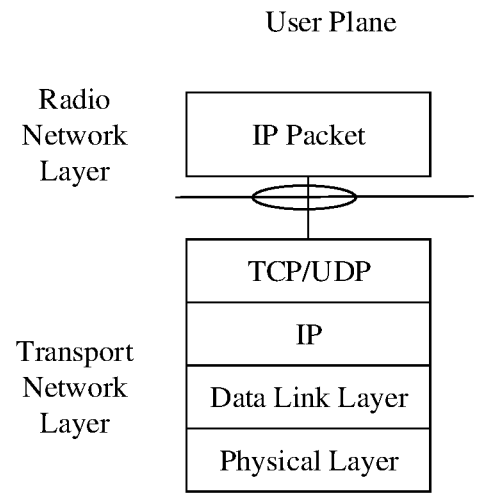
FIG. 5 is a schematic diagram of a protocol stack function of an interface data plane between a CN and a base station according to an embodiment of the present disclosure.

In addition, an IP-packet-based data transmission mode is adopted on the interface between the CN and the base station in the embodiments of the present disclosure. Since the interface between the CN and the base station involves a TNL and an RNL, the data packets transmitted on the RNL are IP packets, and the TNL uses an IP routing protocol. As shown in FIG. 5, for the RNL, the transmitted data packets are in an IP format. The TNL specifically includes a physical layer, a data link layer, an IP layer, and a TCP/UDP layer, and a TCP or UDP mode may be selected according to data packet transmission characteristics (a data packet size, the length of interval between two adjacent data packets, a reliability requirement of the data packet, etc.) when different services or data packets are to be sent, the QoS requirement, and so on.

The QoS architecture and protocol stack function of the embodiments of the present disclosure are introduced above. A data transmission method of the embodiments of the present disclosure is introduced below from the terminal side, the base station side and the CN side respectively.

Figure 6:
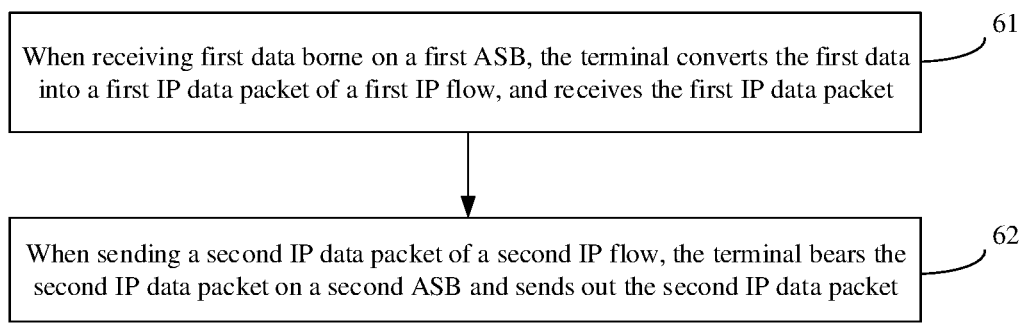
FIG. 6 is a flowchart of a data transmission method according to an embodiment of the present disclosure.

Referring to FIG. 6, when applied to a terminal, a data transmission method provided by the embodiments of the present disclosure may include the following steps.

At S61, when receiving first data borne on a first ASB, the terminal converts the first data into a first IP data packet of a first IP flow, and receives the first IP data packet.

Here, when receiving the first data borne on the first ASB and sent by the base station, the terminal may determine the first IP flow corresponding to the first ASB according to the mapping relationships between IP flows and ASBs.

Here, when an AS of the terminal receives the first data sent by the network, after performing the processing of S61, the terminal sends the obtained first IP data packet to an NAS. That is, an IP-based data transmission mode is adopted between the AS and the NAS in the embodiments of the present disclosure.

In addition, according to the IP packet processing mechanism, receiving the first IP data packet may specifically include that: header and value check is performed on the first IP data packet; when the header and value check is passed, the first IP data packet is sent to the NAS of the terminal; when the header and value check fails, a retransmission request for the first IP data packet is sent to the terminal.

At S62, when sending a second IP data packet of a second IP flow, the terminal bears the second IP data packet on a second ASB and then sends the second IP data packet out.

Here, when sending the second IP data packet of the second IP flow to the base station, the terminal may determine the second ASB corresponding to the second IP flow according to the mapping relationships between the IP flows and the ASBs.

Here, when the AS of the terminal receives the second IP data packet sent by the NAS of the terminal, the terminal sends the data packet out after performing the processing of S62.

Through the above steps, according to the embodiments of the present disclosure, using the IP-based data transmission mode between the AS and the NAS of the terminal can introduce a new QoS control function in an RAN, thereby implementing an end-to-end QoS architecture solution, and providing support for rollback and lossless handover of IP packets.

In order to implement the rollback and lossless handover of the IP packets, the second IP data packet may be cached in the AS of the terminal in S62. When receiving the retransmission request for the second IP data packet sent by the base station later, the terminal resends the second IP data packet cached in the AS; and when receiving the feedback information indicating the successful reception of the second IP data packet sent by the base station, the terminal deletes the second IP data packet cached in the AS. Through the above steps, in the embodiments of the present disclosure, when the data needs to be retransmitted, the second IP data packet cached in the AS may be resent directly according to the data cached in the AS, so that there is no need to send the data forwarding request to the NAS of the terminal, thus implementing the data rollback mechanism between the AS and the NAS, and improving the data transmission efficiency.

Referring to the architecture shown in FIG. 3, the ASB in the embodiments of the present disclosure may specifically be a combination of the QoS flow and the DRB, and the mapping relationships between the IP flows and the ASBs are the mapping relationships between the IP flows and the QoS flows and/or the DRBs. In this case, the same DRB can only belong to the same PDU session. One PDU session includes at least one IP flow. In addition, the mapping relationships between the IP flows and the QoS flows include many-to-one relationship and one-to-one relationship; the mapping relationships between the QoS flows and the DRBs include many-to-one relationship, one-to-one relationship, and one-to-many relationship.

Referring to the architecture shown in FIG. 4, the ASB in the embodiments of the present disclosure may specifically be any of the following: a QoS flow, a DRB, a logical channel, a transport channel, a physical channel, and a bearer which is defined in the AS for bearing the IP data packets. In this case, the mapping relationships between the IP flows and the ASBs include many-to-one relationship, one-to-one relationship, and one-to-many relationship.

In addition, the terminal of the embodiments of the present disclosure may receive a QoS parameter configuration command of the AS sent by the base station in the process that the base station establishes, adds or reconfigures the PDU session of the first service of the terminal, and then determine the mapping relationship between the IP flow and the ASB of the PDU session according to the QoS parameter configuration command.

In addition, it is to be noted that there is no strict sequence between S61 and S62, that is, S61 may precede S62, or S62 may precede S61, or they are executed at the same time.

Figure 7:
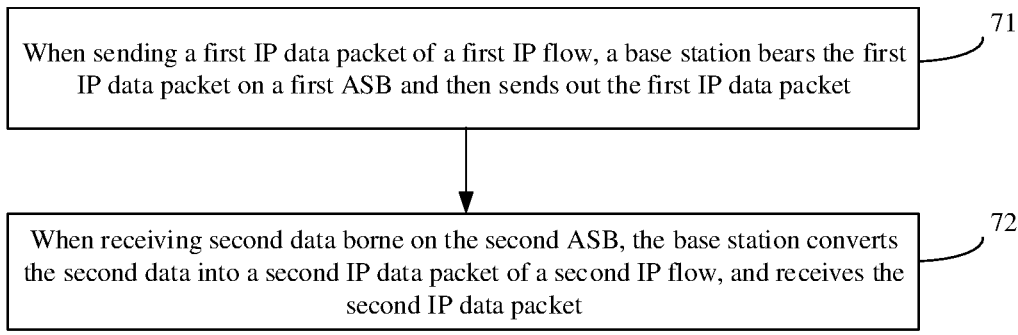
FIG. 7 is a flowchart of a data transmission method according to an embodiment of the present disclosure.

Referring to FIG. 7, when applied to a base station, a data transmission method provided by the embodiments of the present disclosure may include the following steps.

At S71, when sending a first IP data packet of a first IP flow, the base station bears the first IP data packet on a first ASB and then sends the first IP data packet out.

Here, when sending the first IP data packet of the first IP flow to the terminal, the base station may determine the first ASB corresponding to the first IP flow according to the mapping relationships between the IP flows and the ASBs.

Here, when receiving the first IP data packet from the NAS of the base station, the AS of the base station bears the first IP data packet on the first ASB according to the mapping relationships between the IP flows and the ASBs and then sends the first IP data packet out.

At S72, when receiving second data borne on the second ASB, the base station converts the second data into a second IP data packet of a second IP flow, and receives the second IP data packet.

Here, when receiving the second data borne on the second ASB and sent by the terminal, the base station may determine the second IP flow corresponding to the second ASB according to the mapping relationships between the IP flows and the ASBs.

Here, when receiving the second data from the terminal, the AS of the base station converts the second data into the second IP packet according to the mapping relationships and then sends the second IP packet to the NAS of the base station.

In addition, according to the IP packet processing mechanism, receiving the second IP data packet may specifically include that: header and value check is performed on the second IP data packet; when the header and value check is passed, the second IP data packet is sent to the NAS of the base station; when the header and value check fails, a retransmission request for the second IP data packet is sent to the terminal.

Through the above steps, according to the embodiments of the present disclosure, using the IP-based data transmission mode between the AS and the NAS of the base station can introduce a new QoS control function in an RAN, thereby implementing an end-to-end QoS architecture solution, and providing support for rollback and lossless handover of IP packets.

In order to implement the rollback and lossless handover of the IP packets, the first IP data packet may be cached in the AS of the base station in S71.

When receiving the retransmission request for the first IP data packet sent by the terminal, the base station resends the first IP data packet cached in the AS; when receiving the retransmission request for the first IP data packet sent by the terminal later, the base station resends the first IP data packet cached in the AS; and when receiving the feedback information indicating successful reception of the first IP data packet sent by the terminal, the base station deletes the first IP data packet cached in the AS. Through the above steps, in the embodiments of the present disclosure, when the data needs to be retransmitted, the first IP data packet cached in the AS may be resent directly according to the data cached in the AS, so that there is no need to send the data forwarding request to the UPF, the data rollback mechanism between the AS and the NAS can be implemented, thus improving the data transmission efficiency.

Similarly, with reference to the architecture shown in FIG. 3, the ASB of the embodiments of the present disclosure may be a combination of the QoS flow and the DRB. The mapping relationships between the IP flows and the ASBs are mapping relationships of the IP flows with the QoS flows and/or the DRBs. In this case, the same DRB can only belong to the same PDU session. One PDU session includes at least one IP flow. In addition, the mapping relationships between the IP flows and the QoS flows include many-to-one relationship and one-to-one relationship; the mapping relationships between the QoS flows and the DRBs include many-to-one relationship, one-to-one relationship, and one-to-many relationship.

Referring to the architecture shown in FIG. 4, the ASB in the embodiments of the present disclosure may specifically be one of the following: a QoS flow, a DRB, a logical channel, a transport channel, a physical channel, and a bearer which is defined in the AS for bearing the IP data packets. In this case, the mapping relationships between the IP flows and the ASBs include many-to-one relationship, one-to-one relationship, and one-to-many relationship.

In order to implement QoS control, in the process of establishing, adding or reconfiguring the PDU session of the first service of the terminal, the base station of the embodiments of the present disclosure determines the QoS requirement for the receiving and sending of data of the first service on the air interface, then, configures the mapping relationship between the IP flow and the ASB of the PDU session of the first service according to the QoS requirement for the receiving and sending of data of the first service on the air interface, and sends the QoS parameter configuration command of the AS to the terminal. The QoS parameter configuration command is used for configuring the mapping relationship between the IP flow and the ASB of the PDU session of the first service at the terminal side.

Specifically, the base station may determine the QoS requirement for the receiving and sending of data of the first service on the air interface according to at least one of the QoS requirement of the first service configured by the CN, the channel quality of the terminal or the requirement of a wireless system to which the base station belongs for the transmission quality of the air interface.

For the data transmission between the base station and the CN, when the TNL of the base station receives the third IP data packet from the RNL of the base station, according to the data packet transmission characteristic and/or a QoS requirement corresponding to the third IP data packet, the base station may convert the third IP data packet into the first TCP datagram or the first UDP datagram and then send the first TCP datagram or the first UDP datagram out. In addition, when the RNL of the base station receives a second TCP datagram or a second UDP datagram from the CN, the base station converts the second TCP datagram or the second UDP datagram into a fourth IP data packet and then sends the fourth IP data packet to the TNL of the base station.

In addition, it is to be noted that there is no strict sequence between S71 and S72, that is, S71 may precede S72, or S72 may precede S71, or they may be executed at the same time.

Figure 8:
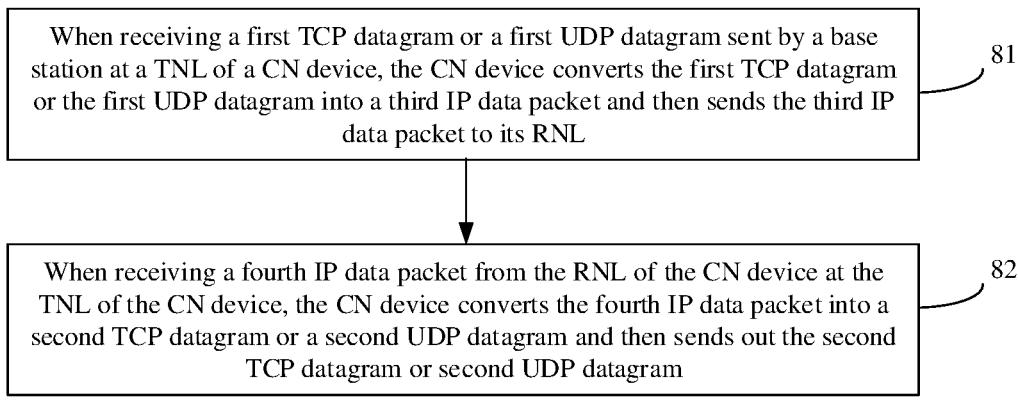
FIG. 8 is a flowchart of a data transmission method according to an embodiment of the present disclosure.

Referring to FIG. 8, when applied to a CN device, a data transmission method provided by the embodiments of the present disclosure may be implemented on one or more CN elements of a CN. The method may include the following steps.

At S81, when the TNL of the CN device receives a first TCP datagram or a first UDP datagram sent by the base station, the CN device converts the first TCP datagram or the first UDP datagram into a third IP data packet and then sends the third IP data packet to its RNL.

Here, after the TNL of the CN device receives the first TCP datagram or the first UDP datagram, the CN device converts the first TCP datagram or the first UDP datagram into the IP data packet and then sends the first TCP datagram or the first UDP datagram to the RNL of the CN element.

At S82, when the TNL of the CN device receives a fourth IP data packet from the RNL of the CN device, the CN device converts the fourth IP data packet into a second TCP datagram or a second UDP datagram according to the data packet transmission characteristics and/or QoS requirements corresponding to the fourth IP data packet, and then sends the second TCP datagram or the second UDP datagram out.

It is to be noted that there is no strict sequence between S81 and S82, that is, S81 may precede S82, or S82 may precede S81, or they may be executed at the same time.

Various methods of the embodiments of the present disclosure are described above. Devices for implementing the above methods are provided below.

Figure 9:
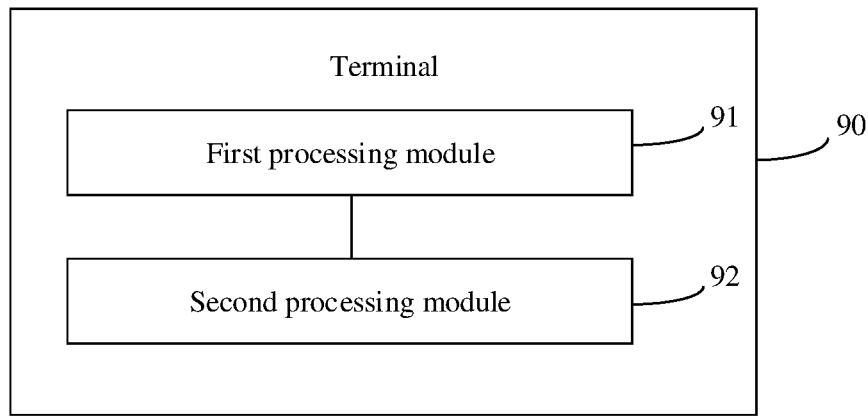
FIG. 9 is a structural schematic diagram of a terminal according to an embodiment of the present disclosure.

Referring to FIG. 9, the embodiments of the present disclosure provide a terminal 90, which may include: a first processing module 91 and a second processing module 92.

The first processing module 91 is configured to convert, when receiving the first data borne on the first ASB, the first data into the first IP data packet of the first IP flow, and receive the first IP data packet.

The second processing module 92 is configured to bear, when sending the second IP data packet of the second IP flow, the second IP data packet on the second ASB and then send the second IP data packet out.

Optionally, the first processing module 91 is further configured to determine the first IP flow corresponding to the first ASB according to the mapping relationships between IP flows and ASBs.

Optionally, the second processing module 92 is further configured to determine the second ASB corresponding to the second IP flow according to the mapping relationships between the IP flows and the ASBs.

Optionally, the first processing module 91 is further configured to: perform header and value check on the first IP data packet; when the header and value check is passed, send the first IP data packet to the NAS of the terminal; and when the header and value check fails, send the retransmission request for the first IP data packet to the terminal.

Optionally, the second processing module 92 is further configured to cache the second IP data packet in the AS; when receiving the retransmission request for the second IP data packet sent by the base station, resend the second IP data packet cached in the AS; and when receiving the feedback information indicating the successful reception of the second IP data packet sent by the base station, delete the second IP data packet cached in the AS.

Optionally, the ASB is a combination of the QoS flow and the DRB, and the mapping relationships between the IP flows and the ASBs are the mapping relationships of the IP flows with the QoS flows and/or the DRBs.

Optionally, the same DRB can only belong to the same PDU session.

Optionally, one PDU session includes at least one IP flow.

Optionally, the mapping relationships between the IP flow and the QoS flow include many-to-one relationship and one-to-one relationship; the mapping relationships between the QoS flow and the DRB include many-to-one relationship, one-to-one relationship, and one-to-many relationship.

Optionally, the ASB is one of the following: a QoS flow, a DRB, a logical channel, a transport channel, a physical channel, and a bearer which is defined in the AS for bearing the IP data packets.

Optionally, the mapping relationships between the IP flows and the ASBs include many-to-one relationship, one-to-one relationship, and one-to-many relationship.

Optionally, the terminal may also include a mapping relationship establishing module.

The mapping relationship establishing module is configured to: in a process that the base station establishes, adds or reconfigures the PDU session of the first service of the terminal, receive the QoS parameter configuration command of the AS sent by the base station; and determine the mapping relationship between the IP flow and the ASB of the PDU session according to the QoS parameter configuration command.

Figure 10:
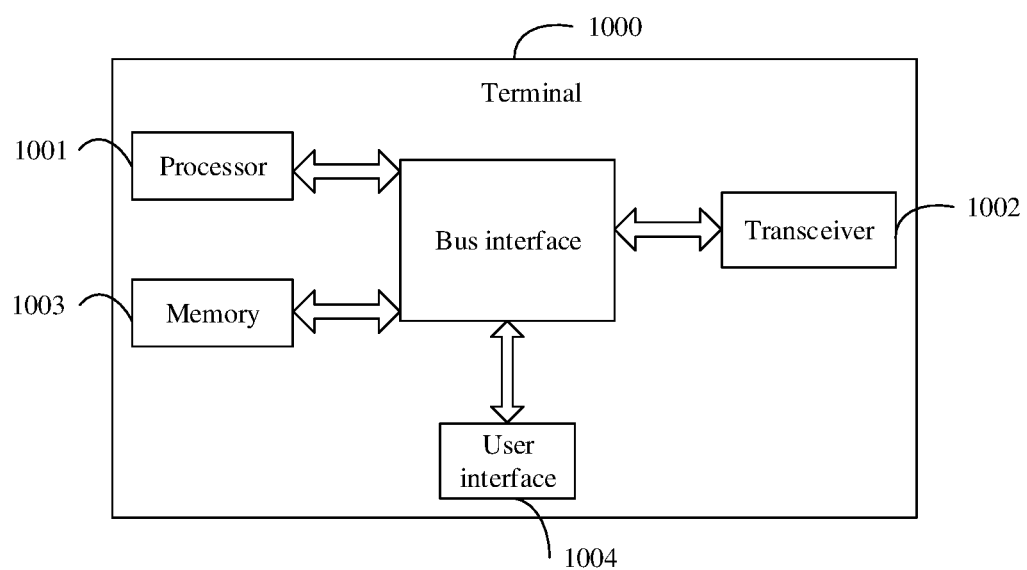
FIG. 10 is another structural schematic diagram of a terminal according to an embodiment of the present disclosure.

FIG. 10 shows another structural schematic diagram of a terminal provided by the embodiments of the present disclosure. The terminal 1000 may include: a processor 1001, a transceiver 1002, a memory 1003, a user interface 1004 and a bus interface.

In the embodiments of the present disclosure, the terminal 1000 may also include: a program stored in the memory 1003 and capable of running in the processor 1001.

When executing the program, the processor 1001 implements the following steps.

When receiving the first data borne on the first ASB, the first data is converted into the first IP data packet of the first IP flow, and the first IP data packet is received.

When sending the second IP data packet of the second IP flow, the second IP data packet is born on the second ASB and then sent out.

It is understandable that, in the embodiments of the present disclosure, when executed by the processor 1001, the computer program can implement each process of the embodiment of the data transmission method shown in FIG. 6, and can achieve the same technical effect. For avoiding repetitions, elaborations are omitted herein.

In FIG. 10, a bus architecture may consist of any number of interconnected buses and bridges which are connected together by various circuits of one or more processors represented by the processor 1001 and memories represented by the memory 1003. The bus architecture may also connect various other circuits together, such as peripheral devices, voltage regulators, and power management circuits, which are well known in the field and therefore are not described further here. The bus interface provides the interface. The transceiver 1002 may be multiple components, that is, includes a transmitter and a receiver, which provide a unit for communicating with a variety of other devices on a transmission medium. For different user devices, a user interface 1004 may also be used to connect externally and internally required devices. The connected devices include, but are not limited to, keypads, monitors, speakers, microphones, joysticks, etc.

The processor 1001 is responsible for managing the bus architecture and general processing, and the memory 1003 may store the data used by the processor 1001 to perform operations.

It is to be noted that the terminal in the present embodiment is the terminal corresponding to the method shown in FIG. 3, and the implementation modes in the above embodiments are applicable to the embodiment of the terminal, and can achieve the same technical effect. In the terminal, the transceiver 1002 and the memory 1003, as well as the transceiver 1002 and the processor 1001 can be in communicate connection through the bus interface, the functions of the processor 1001 can also be implemented by the transceiver 1002, and the functions of the transceiver 1002 can also be implemented by the processor 1001. It is to be noted that the terminal provided by the embodiments of the present disclosure can implement all the steps implemented in the above embodiments of the method, and can achieve the same technical effect. The same parts and beneficial effects in the present embodiment as in the embodiments of the method will not be described in detail here.

In some embodiments of the present disclosure, a computer-readable storage medium is also provided, in which a program is stored. When executed by the processor, the program implements the following steps.

When receiving the first data borne on the first ASB, the first data is converted into the first IP data packet of the first IP flow, and the first IP data packet is received.

When sending the second IP data packet of the second IP flow, the second IP data packet is born on the second ASB and then sent out.

When executed by the processor, the program can implement all implementation modes in the data transmission method applied to the terminal side, and can achieve the same technical effect. For avoiding repetitions, elaborations are omitted herein.

Figure 11:
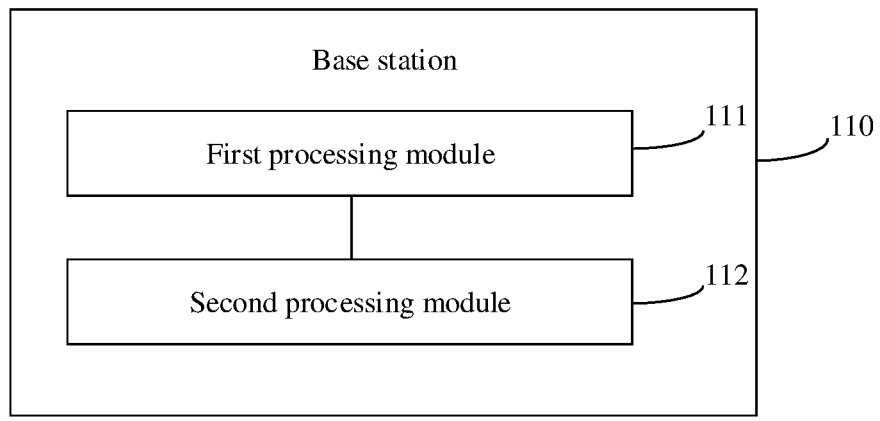
FIG. 11 is a structural schematic diagram of a base station according to an embodiment of the present disclosure.

Referring to FIG. 11, the embodiments of the present disclosure provide a base station 110, which may include: a first processing module 111 and a second processing module 112.

The first processing module 111 is configured to bear, when sending the first IP data packet of the first IP flow, the first IP data packet on the first ASB and then send the first IP data packet out.

The second processing module 112 is configured to convert, when receiving the second data borne on the second ASB, the second data into the second IP data packet of the second IP flow, and receive the second IP data packet.

Optionally, the first processing module 111 is further configured to determine the first ASB corresponding to the first IP flow according to mapping relationships between the IP flows and the ASBs.

The second processing module 112 is further configured to determine the second IP flow corresponding to the second ASB according to the mapping relationships between the IP flows and the ASBs.

Optionally, the second processing module 112 is further configured to: perform header and value check on the second IP data packet; when the header and value check is passed, send the second IP data packet to the NAS of the base station; and when the header and value check fails, send the retransmission request for the second IP data packet to the terminal.

Optionally, the first processing module 111 is further configured to cache the first IP data packet in the AS; when receiving the retransmission request for the first IP data packet sent by the terminal, resend the first IP data packet cached in the AS; and when receiving the feedback information indicating the successful reception of the first IP data packet sent by the terminal, delete the first IP data packet cached in the AS.

Optionally, the ASB is a combination of the QoS flow and the DRB, and the mapping relationships between the IP flows and the ASBs are the mapping relationships of the IP flows with the QoS flows and/or the DRBs.

Optionally, the same DRB can only belong to the same PDU session.

Optionally, one PDU session includes at least one IP flow.

Optionally, the mapping relationships between the IP flows and the QoS flows include many-to-one relationship and one-to-one relationship; the mapping relationships between the QoS flows and the DRBs include many-to-one relationship, one-to-one relationship, and one-to-many relationship.

Optionally, the ASB is one of the following: a QoS flow, a DRB, a logical channel, a transport channel, a physical channel, and a bearer which is defined in the AS for bearing the IP data packets.

Optionally, the mapping relationships between the IP flow and the ASB include many-to-one relationship, one-to-one relationship, and one-to-many relationship.

Optionally, the base station may further include a configuring module.

The configuring module is configured to: in a process of establishing, adding or reconfiguring the PDU session of the first service of the terminal, determine the QoS requirement for the receiving and sending of data of the first service on the air interface; configure the mapping relationship between the IP flow and the ASB of the PDU session of the first service according to the QoS requirement for the receiving and sending of data of the first service on the air interface, and send the QoS parameter configuration command of the AS to the terminal. The QoS parameter configuration command is used for configuring the mapping relationship between the IP flow and the ASB of the PDU session of the first service at the terminal side.

Optionally, the configuring module is further configured to: determine the QoS requirement for the receiving and sending of data of the first service on the air interface according to at least one of the QoS requirement of the first service configured by the CN, the channel quality of the terminal or the requirement of a wireless system to which the base station belongs for the transmission quality of the air interface.

Optionally, the base station may further include a third processing module and a fourth processing module.

The third processing module is configured to: when the TNL of the base station receives the third IP data packet from the RNL of the base station, convert the third IP data packet into the first TCP datagram or the first UDP datagram according to a data packet transmission characteristic and/or a QoS requirement corresponding to the third IP data packet, and then send the first TCP datagram or the first UDP datagram out.

The fourth processing module is configured to: when the RNL of the base station receives the second TCP datagram or the second UDP datagram from the CN, convert the second TCP datagram or the second UDP datagram into the fourth IP data packet and then send the fourth IP data packet to the TNL.

Figure 12:
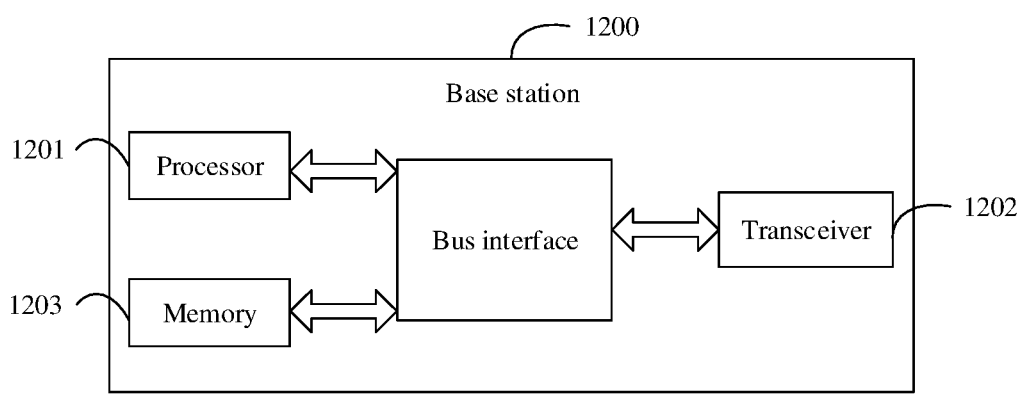
FIG. 12 is another structural schematic diagram of a base station according to an embodiment of the present disclosure.

Referring to FIG. 12, the embodiments of the present disclosure provide a structural schematic diagram of a network side device 1200, which may include: a processor 1201, a transceiver 1202, a memory 1203 and a bus interface.

In the embodiments of the present disclosure, the network side device 1200 may also include: a program stored in the memory 1203 and capable of running in the processor 1201. When executed by the processor 1201, the program implements the following steps.

When sending the first IP data packet of the first IP flow, the first IP data packet is born on the first ASB and then sent out.

When receiving the second data borne on the second ASB, the second data is converted into the second IP data packet of the second IP flow, and the second IP data packet is received.

It is understandable that, in the embodiments of the present disclosure, when executed by the processor 1201, the computer program can implement each process of the embodiment of the data transmission method shown in FIG. 7, and can achieve the same technical effect. For avoiding repetitions, elaborations are omitted herein.

In FIG. 12, a bus architecture may consist of any number of interconnected buses and bridges which are linked together by various circuits of one or more processors represented by the processor 1201 and memories represented by the memory 1203. The bus architecture may also link various other circuits together, such as peripheral devices, voltage regulators, and power management circuits, which are well known in the field and therefore are not described further here. The bus interface provides the interface. The transceiver 1202 may be multiple components, that is, including a transmitter and a receiver, which provide a unit(s) for communicating with a variety of other devices on a transmission medium.

The processor 1201 is responsible for managing the bus architecture and general processing, and the memory 1203 may store the data used by the processor 1201 to perform operations.

It is to be noted that the terminal in the present embodiment is the base station corresponding to the method shown in FIG. 7, and the implementation modes in the above embodiments are applicable to the embodiment of the base station, and can achieve the same technical effect. In the base station, the transceiver 1202 and the memory 1203, as well as the transceiver 1202 and the processor 1201 can be in communicate connection through the bus interface, the functions of the processor 1201 can also be implemented by the transceiver 1202, and the functions of the transceiver 1202 can also be implemented by the processor 1201. It is to be noted that the base station provided by the embodiments of the present disclosure can implement all the steps implemented in the above embodiments of the method, and can achieve the same technical effect. The same parts and beneficial effects in the present embodiment as in the embodiments of the method will not be described in detail here.

In some embodiments of the present disclosure, a computer-readable storage medium is also provided, in which a program is stored. When executed by the processor, the program implements the following steps.

When sending the first IP data packet of the first IP flow, the first IP data packet is born on the first ASB and then sent out.

When receiving the second data borne on the second ASB, the second data is converted into the second IP data packet of the second IP flow, and the second IP data packet is received.

When executed by the processor, the program can implement all implementation modes in the data transmission method applied to the base station, and can achieve the same technical effect. For avoiding repetitions, elaborations are omitted herein.

Figure 13:
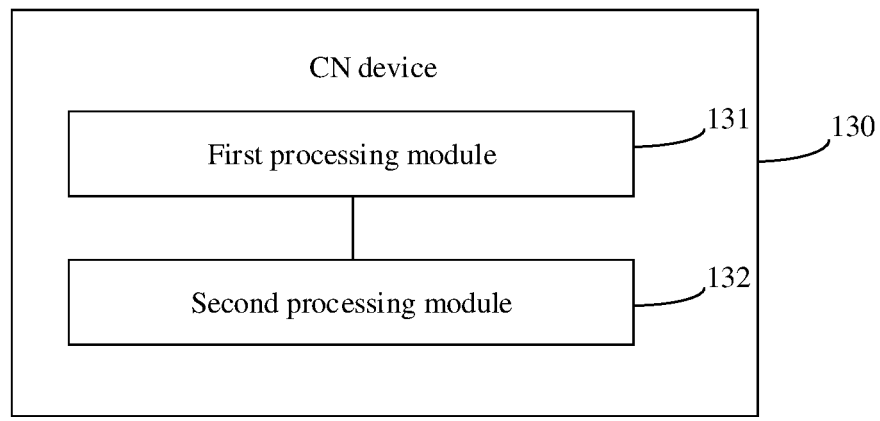
FIG. 13 is a structural schematic diagram of a CN device according to an embodiment of the present disclosure.

Referring to FIG. 13, the embodiments of the present disclosure provide a CN device 130. The CN device 130 may be one or more CN elements or function entities. As shown in FIG. 13, the CN device 130 may include: a first processing module 131 and a second processing module 132.

The first processing module 131 is configured to convert, when the TNL of the CN device receives the first TCP datagram or the first UDP datagram sent by the base station, the first TCP datagram or the first UDP datagram into the third IP data packet and then send the third IP data packet to the RNL of the CN device.

The second processing module 132 is configured to: when the TNL of the CN device receives the fourth IP data packet from the RNL of the CN device, convert the fourth IP data packet into the second TCP datagram or the second UDP datagram according to a data packet transmission characteristic and/or a QoS requirement corresponding to the fourth IP data packet, and then send the second TCP datagram or the second UDP datagram out.

Figure 14:
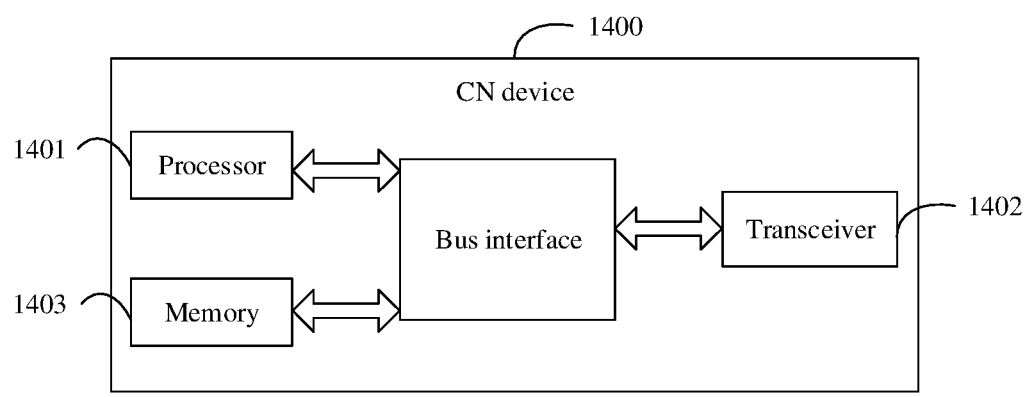
FIG. 14 is another structural schematic diagram of a CN device according to an embodiment of the present disclosure.

Referring to FIG. 14, the embodiments of the present disclosure provide a structural schematic diagram of a network side device 1400, which may include: a processor 1401, a transceiver 1402, a memory 1403 and a bus interface.

In the embodiments of the present disclosure, the network side device 1400 may also include: a program stored in the memory 1403 and capable of running in the processor 1401. When executed by the processor 1401, the program implements the following steps.

When the TNL of the CN receives the first TCP datagram or the first UDP datagram sent by the base station, the first TCP datagram or the first UDP datagram is converted into the third IP data packet and then sent to the RNL of the CN.

When the TNL of the CN receives the fourth IP data packet from the RNL of the CN, according to the data packet transmission characteristics and/or QoS requirements corresponding to the fourth IP data packet, the fourth IP data packet is converted into the second TCP datagram or the second UDP datagram and then sent out.

It is understandable that, in the embodiments of the present disclosure, when executed by the processor 1401, the computer program can implement each process of the embodiment of the data transmission method shown in FIG. 8, and can achieve the same technical effect. For avoiding repetitions, elaborations are omitted herein.

In FIG. 14, a bus architecture may consist of any number of interconnected buses and bridges which are linked together by various circuits of one or more processors represented by the processor 1401 and memories represented by the memory 1403. The bus architecture may also link various other circuits together, such as peripheral devices, voltage regulators, and power management circuits, which are well known in the field and therefore are not described further here. The bus interface provides the interface. The transceiver 1402 may be multiple components, that is, includes a transmitter and a receiver, which provide a unit for communicating with a variety of other devices on a transmission medium.

The processor 1401 is responsible for managing the bus architecture and general processing, and the memory 1403 may store the data used by the processor 1401 to perform operations.

It is to be noted that the terminal in the present embodiment is the CN device corresponding to the method shown in FIG. 8, and the implementation modes in the above embodiments are applicable to the embodiment of the CN device, and can achieve the same technical effect. In the CN device, the transceiver 1402 and the memory 1403, as well as the transceiver 1402 and the processor 1401 can be in communicate connection through the bus interface, the functions of the processor 1401 can also be implemented by the transceiver 1402, and the functions of the transceiver 1402 can also be implemented by the processor 1401. It is to be noted that, the CN device provided by the embodiments of the present disclosure can implement all the steps implemented in the above embodiments of the method, and can achieve the same technical effect. The same parts and beneficial effects in the present embodiment as in the embodiments of the method will not be described in detail here.

In some embodiments of the present disclosure, a computer-readable storage medium is also provided, in which a program is stored. When executed by the processor, the program implements the following steps.

When the TNL of the CN receives the first TCP datagram or the first UDP datagram sent by the base station, the first TCP datagram or the first UDP datagram is converted into the third IP data packet and then sent to the RNL of the CN.

When the TNL of the CN receives the fourth IP data packet from the RNL of the CN, according to the data packet transmission characteristics and/or QoS requirements corresponding to the fourth IP data packet, the fourth IP data packet is converted into the second TCP datagram or the second UDP datagram and then sent out.

When executed by the processor, the program can implement all implementation modes in the data transmission method applied to the CN, and can achieve the same technical effect. For avoiding repetitions, elaborations are omitted herein.

Those of ordinary skill in the art may realize that the units and algorithm steps of each example described in combination with the embodiments disclosed in the present disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description.

In the embodiments provided by the present disclosure, it is to be understood that the disclosed device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions in the embodiments of the present disclosure according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the present disclosure. The storage media include: various media capable of storing program codes such as a USB flash disk, a mobile hard disk, a Read-Only Memory (ROM), a Random Access Memory (RAM), a magnetic disk or a compact disc.

The above is only the specific implementation manner of the present disclosure and not intended to limit the scope of protection of the present disclosure. Any variations or replacements apparent to those skilled in the art within the technical scope disclosed by the present disclosure shall fall within the scope of protection of the present disclosure. Therefore, the protection scope of the present disclosure shall be subject to the protection scope of the claims.

What is claimed is:

1. A data transmission method, applied to a terminal, the method comprising:
   when receiving first data borne on a first Access Stratum (AS) Bearer (ASB), converting, by a terminal, the first data into a first Internet Protocol (IP) data packet of a first IP flow, and receiving the first IP data packet;
   when sending a second IP data packet of a second IP flow, bearing, by the terminal, the second IP data packet on a second ASB and then sending the second IP data packet out,
   caching, by the terminal, the second IP data packet in an AS;
   when receiving the retransmission request for the second IP data packet, resending, by the terminal, the second IP data packet cached in the AS; and
   when receiving feedback information indicating successful reception of the second IP data packet, deleting, by the terminal, the second IP data packet cached in the AS.

2. The method of claim 1, wherein,
before converting the first data into the first IP data packet of the first IP flow, the method further comprises: determining the first IP flow corresponding to the first ASB according to mapping relationships between IP flows and ASBs; and
before bearing the second IP data packet on the second ASB and then sending the second IP data packet out, the method further comprises: determining the second ASB corresponding to the second IP flow according to the mapping relationships between the IP flows and the ASBs.

3. The method of claim 1, wherein receiving the first IP data packet comprises:
performing header and value check on the first IP data packet;
when the header and value check is passed, sending the first IP data packet to a Non-Access Stratum (NAS) of the terminal;
when the header and value check fails, sending a retransmission request for the first IP data packet.

4. The method of claim 1, wherein the ASB is a combination of a Quality of Service (QoS) flow and a Data Radio Bearer (DRB), and mapping relationships between IP flows and ASBs are mapping relationships of the IP flows with the QoS flows and/or the DRBs.

5. The method of claim 1, wherein,
the ASB is at least one of the following: a QoS flow, a DRB, a logical channel, a transport channel, a physical channel, and a bearer defined in the AS for bearing the IP data packets.

6. The method of claim 1, further comprising:
in a process that a base station establishes, adds or reconfigures a Protocol Data Unit (PDU) session of a first service of the terminal, receiving a QoS parameter configuration command of the AS sent by the base station; and
determining a mapping relationship between the IP flow and the ASB of the PDU session, according to the QoS parameter configuration command.

7. A terminal, comprising: a processor, a non-transitory memory, and a program which is stored in the non-transitory memory and capable of running in the processor, wherein the program, when executed by the processor, implements steps of the data transmission method of claim 1.

8. A data transmission method, applied to a base station, the method comprising:
when sending a first IP data packet of a first IP flow, bearing, by the base station, the first IP data packet on a first Access Stratum (AS) Bearer (ASB) and then sending the first IP data packet out;
when receiving second data borne on a second ASB, converting, by the base station, the second data into a second IP data packet of a second IP flow, and receiving the second IP data packet,
caching, by the base station, the first IP data packet in an AS;
when receiving the retransmission request for the first IP data packet resending, by the base station, the first IP data packet cached in the AS; and
when receiving feedback information indicating successful reception of the first IP data packet, deleting, by the base station, the first IP data packet cached in the AS.

9. The method of claim 8, wherein,
before bearing the first IP data packet on the first ASB and then sending the first IP data packet out, the method further comprises: determining the first ASB corresponding to the first IP flow according to mapping relationships between IP flows and ASBs; and
before converting the second data into the second IP data packet of the second IP flow, the method further comprises: determining the second IP flow corresponding to the second ASB according to the mapping relationships between the IP flows and the ASBs.

10. The method of claim 8, wherein receiving the second IP data packet comprises:
performing header and value check on the second IP data packet;
when the header and value check is passed, sending the second IP data packet to a Non-Access Stratum (NAS) of the base station; and
when the header and value check fails, sending a retransmission request for the second IP data packet.

11. The method of claim 8, wherein the ASB is a combination of a Quality of Service (QoS) flow and a Data Radio Bearer (DRB), and mapping relationships between the IP flows and the ASBs are mapping relationships of the IP flows with the QoS flows and/or the DRBs.

12. The method of claim 8, wherein the ASB is one of the following: a QoS flow, a DRB, a logical channel, a transport channel, a physical channel, and a bearer defined in the AS for bearing the IP data packets.

13. The method of claim 8, further comprising:
in a process of establishing, adding or reconfiguring a Protocol Data Unit (PDU) session of a first service of a terminal, determining a QoS requirement for the receiving and sending of data of the first service on an air interface;
configuring a mapping relationship between the IP flow and the ASB of the PDU session of the first service according to the QoS requirement for the receiving and sending of data of the first service on the air interface, and sending a QoS parameter configuration command of the AS to the terminal, wherein the QoS parameter configuration command is used for configuring the mapping relationship between the IP flow and the ASB of the PDU session of the first service at the terminal side.

14. The method of claim 13, wherein determining the QoS requirement for the receiving and sending of data of the first service on the air interface comprises:
determining the QoS requirement for the receiving and sending of data of the first service on the air interface, according to at least one of a QoS requirement for the first service configured by a Core Network (CN), a channel quality of the terminal, or a requirement of a wireless system to which the base station belongs for a transmission quality of the air interface.

15. The method of claim 8, further comprising:
receiving, by a Transport Network Layer (TNL) of the base station, a third IP data packet from a Radio Network Layer (RNL) of the base station, converting, by the base station, the third IP data packet into a first Transmission Control Protocol (TCP) datagram or a first User Datagram Protocol (UDP) datagram according to a data packet transmission characteristic and/or a QoS requirement corresponding to the third IP data packet, and then sending the first TCP datagram or the first UDP datagram out;
receiving, by the RNL of the base station, a second TCP datagram or a second UDP datagram from the CN, converting, by the base station, the second TCP datagram or the second UDP datagram into a fourth IP data packet and then sending the fourth IP data packet to the TNL.

16. A base station, comprising: a processor, a non-transitory memory, and a program which is stored in the non-transitory memory and capable of running in the processor, wherein the program, when executed by the processor, implements steps of the data transmission method of claim 8.

* * * * *